April 29, 1952  W. R. H. BREUER  2,594,387
FISHING DEVICE
Filed Oct. 12, 1950
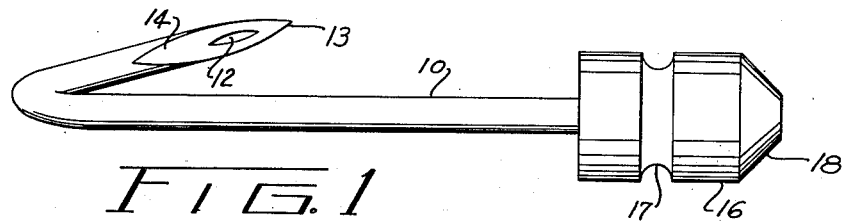
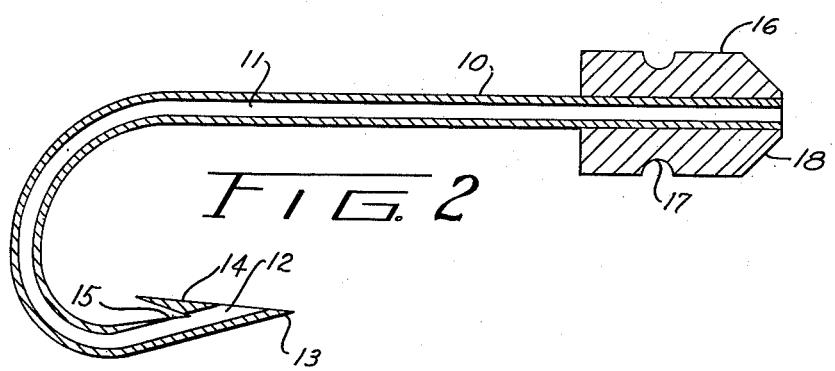
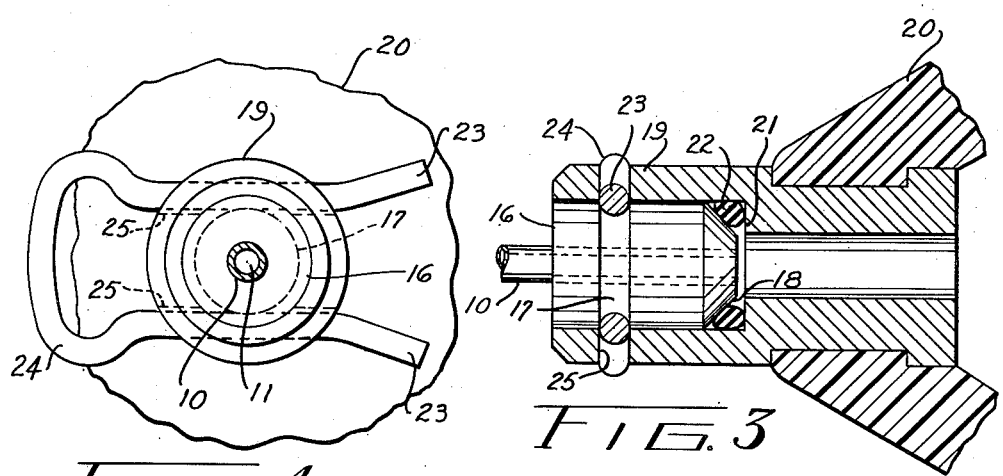
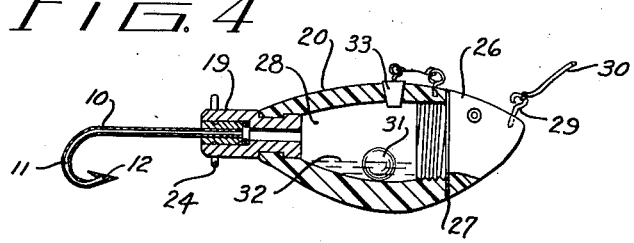
INVENTOR.
WILLIAM R. H. BREUER
BY
Van Deventer & Shively
ATTORNEYS Patented Apr. 29, 1952

2,594,387

UNITED STATES PATENT OFFICE 2,594,387

FISHING DEVICE

William R. H. Breuer, St. Albans, N. Y.

Application October 12, 1950, Serial No. 189,773

8 Claims. (Cl. 43—42.06)

The present invention pertains to improvements in fishing devices.

An object of the invention is to provide an improved device for luring and catching fish without the use of live bait.

A further object is to provide a device of the above nature including a barbed hook and means to produce a succession of gas bubbles at the point thereof.

A further object is to provide a tubular fishhook having an inlet for gas at the attachment end thereof and one or more discharge orifices at or immediately adjacent the point and barb.

Another object is to provide a lure including a hollow body adapted to contain an effervescent mixture and having the tubular hook removably coupled thereto so that the passage through the hook is normally the sole outlet for gas evolved in the body.

Another object is to provide a lure combination of the above nature in which the stream of gas bubbles issuing from the point of the hook causes the device to sway back and forth in a life-like manner.

Other objects and advantages of the invention will become evident during the course of the following description in connection with the accompanying drawings, in which:

Figure 1 is an enlarged exterior view of a preferred form of tubular hook;

Figure 2 is a longitudinal sectional view of the same;

Figure 3 is an enlarged fragmental sectional view of a means for coupling the hook to the hollow lure body;

Figure 4 is a rear end view of the same; and

Figure 5 is a longitudinal view partly in section, of a typical complete lure embodying the invention.

Referring to Figures 1 and 2, the numeral 10 designates a fish hook of tubular material such as that used in hypodermic needles, having an internal passage 11 throughout its length. The outlet end 12 of the passage 11 terminates closely adjacent the sharpened point 13 of the hook. The hook 10 may be provided with a barb 14, which may be struck outward from the tubular body to leave a second small orifice 15 thereunder if desired, as shown in Figure 2.

The shank end of the hook 10 has secured thereon a cylindrical coupling member 16 having a circumferential groove 17 and a terminal chamfer or bevel 18.

Referring to Figures 3 and 5, it will be seen that the coupling member is slidable into a sleeve 19 secured in the rear end of a lure body 20, the latter preferably being of suitable plastic material with the sleeve molded therein as an insert.

The sleeve 19 has an internal shoulder 21 against which is disposed a resilient ring 22 of rubber or the like. In attaching the hook to the lure body the coupling member 16 is pushed into the sleeve 19 until the chamfered end 18 of the coupler engages and compresses the ring 22 to form a seal as shown in Figure 3, whereupon the circumferential groove 17 is engaged by the prongs 23 of a suitable spring fork or hair-pin clip 24 disposed in slots 25 in the sleeve 19. By this means the coupler 16 carrying the hook 10 is securely locked in sealing position as shown. When it is desired to disassemble the combination, the prongs 23 are spread apart to disengage the groove 17 and the coupler member 16 is withdrawn.

A closure cap 26, provided with a suitable gasket 27, is screwed into the front end of the body 20 as shown in Figure 5, thus defining a chamber 28 from which the only outlet normally is through the hollow hook 10. The cap 26 may advantageously be shaped to complete the characteristic form of the lure, and may carry an eye 29 for attachment of the line or leader 30.

The chamber 28 is adapted to contain an effervescent mixture, for example a bicarbonate with a fruit acid, adapted to evolve $CO_2$ gas. The solid elements of the initial mixture may conveniently be loaded in the form of a pellet 31 placed in the chamber 28 with a small amount of water 32. A small safety plug 33 in the wall of the chamber 28 is normally held frictionally therein in tight sealing relation, but is adapted to blow out if accidental plugging of the normal outlet through the hook 10 should cause undue pressure rise in the chamber.

In operation, the hook 10 is attached in the manner described, the pellet 31 and water 32 are placed in the chamber 28, and the cap 26 is screwed tightly in place. The hook 10 is left bare, and the lure is cast in the usual manner. The reaction of the mixture in the chamber 28 produces $CO_2$ gas which passes through the passage 11 and issues as a stream of bubbles from the principal orifice 12 at the point 13 of the hook. The bombardment of the $CO_2$ molecules against the surfaces of the water surrounding the orifice, together with the angular cant of the curved portion of the hook as shown in Figure 1, causes the hook and its attached lure to sway back and forth in the water. The combination of bubbles and motion results in a life-like movement which acts as an attractant for game fish.

Reference books on the art of angling agree unanimously that almost all game and pan fish feed by sight rather than scent. This accounts for the wide use of natural and mechanical lures that produce motion and bubbles to attract fish to the hook. Some of the common natural lures used for this purpose are worms, frogs, mice and minnows all of which when hooked as bait and cast into water produce motion and bubbles in their attempt to free themselves from the hook. The effectiveness of the mechanical lures such as spinners, spoons and artificial flies is also based on the production of motion and bubbles. In the latter case, with prior devices, the motion normally is not self-induced but created by the angler by manipulating (jerking) the rod after casting, a manual operation made unnecessary by the present invention as noted above.

However, while as stated, the production of bubbles is a strong attractant for game fish, the effectiveness thereof with prior devices is lessened by the fact that the bubbles are produced more or less haphazardly, or without optimum relationship to the hook or hooks. It is well known that when a fish is attracted by bubbles, he strikes directly at the source thereof. Consequently, when bubbles are produced from the body of a lure or at any other point more or less separated from the hook, fish striking at the source of the bubbles frequently deflect the hook or miss it altogether. Thus the hooking of fish by such means is a somewhat random process, this being a principal reason for the common use of multiple or gang hooks to increase the probability of a catch.

With the present invention, on the other hand, the source of the bubble stream is in effect directly at the point of the hook itself, and since this source is the object of the fish's strike, proper hooking is practically assured. Even in case the main orifice 12 should become plugged, the second orifice 15, which is protected by the barb 14, maintains the bubble stream so near the point of the hook as to still produce the desired certainty of effect.

The passage 11 being of small diameter, the duration of the issuance of bubbles may be made as long as needed, dependent on the concentration and quantity of the effervescent combination used. If desired, small amounts of fish oil or other attractants may be included in the combination, so that small quantities thereof may be carried out with the gas to act as a chum, attracting small fish which in turn attract the large ones. The absence of any normal opening to the chamber 28 other than through the hook, in addition to assuring issuance of bubbles only at the proper point, also prevents the entry of mud or other foreign particles which might plug the outlet passage. However, as previously noted, even if for any reason such as carelessness in introducing clogging material in the initial charging, the outlet passage should become stopped up, the safety plug 33 precludes the generation of dangerous pressure in the chamber 28.

While the invention has been described in preferred form it is not limited to the precise structures illustrated, as obviously various changes and modifications may be made without departing from the scope of the appended claims.

What is claimed is:

1. In a device of the character described, in combination, a tubular fish hook having a continuous unobstructed passage throughout the length thereof terminating in a discharge orifice closely adjacent the point of said hook, and tubular coupling means on the shank of said hook adapted to operatively connect said passage to a source of gas whereby said gas may pass through said passage and be discharged at said orifice.

2. A device as claimed in claim 1 including a barb on said hook adjacent said point, and means forming a fixed second discharge orifice from said passage underlying said barb.

3. A device as claimed in claim 1 wherein the curved portion of said hook is canted laterally with respect to the plane of the shank thereof, whereby said discharge orifice may be directed in laterally angular relation to the axis of said shank.

4. A fish lure including, in combination, a hollow body adapted to contain a gas-forming mixture, and a hook having the shank end thereof secured to said body in terminal communication with the hollow interior of said body, said hook having an internal passage extending throughout said communicating shank and the remaining length thereof and comprising an outlet for said gas from said hollow body.

5. A lure as claimed in claim 4 wherein said passage normally comprises the sole outlet for said gas from said body.

6. In a fishing device, in combination, a hollow body, a removable closure on said body and normally defining therewith a chamber adapted to contain a gas-forming mixture, a tubular hook, and means to removably couple said hook to said body in communication with said chamber whereby said tubular hook may comprise an outlet conduit for said gas from said chamber.

7. A device as claimed in claim 6 wherein said coupling means includes a sleeve in the rear of said body and having an internal shoulder, a resilient ring engaging said shoulder, a coupling member on the shank of said hook and slidable in said sleeve into sealing engagement with said resilient ring, and releasable spring means to lock said coupling member in said sleeve in said sealing engagement with said ring.

8. A device as claimed in claim 6 including a normally closed safety device in a wall of said chamber, said device being operable by pressure rise in said body above a pre-determined point to open a safety escape passage for said gas from said body.

WILLIAM R. H. BREUER.

REFERENCES CITED

The following references are of record in the file of this patent:

UNITED STATES PATENTS

| Number | Name | Date |
| --- | --- | --- |
| 2,217,928 | Ward | Oct. 15, 1940 |
| 2,253,125 | Heineke | Aug. 19, 1944 |
| 2,415,742 | Hiltabidel | Feb. 11, 1947 |